United States Patent
Moberg et al.

(10) Patent No.: US 9,173,216 B2
(45) Date of Patent: Oct. 27, 2015

(54) METHOD AND ARRANGEMENT IN A RELAY NODE AND A CONTROLLING NODE

(75) Inventors: Peter Moberg, Stockholm (SE); Gunnar Mildh, Sollentuna (SE); Jessica Östergaard, Stockholm (SE); Håkan Persson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 339 days.

(21) Appl. No.: 13/123,771

(22) PCT Filed: Apr. 5, 2011

(86) PCT No.: PCT/SE2011/050399
§ 371 (c)(1),
(2), (4) Date: Dec. 15, 2011

(87) PCT Pub. No.: WO2011/126437
PCT Pub. Date: Oct. 13, 2011

(65) Prior Publication Data
US 2012/0127915 A1      May 24, 2012

Related U.S. Application Data

(60) Provisional application No. 61/322,452, filed on Apr. 9, 2010.

(51) Int. Cl.
*H04W 72/04* (2009.01)
*H04B 7/155* (2006.01)
*H04B 7/26* (2006.01)
*H04W 84/04* (2009.01)

(52) U.S. Cl.
CPC ........... *H04W 72/0433* (2013.01); *H04B 7/155* (2013.01); *H04B 7/2606* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 2009/0191882 A1* | 7/2009 | Kovacs et al. | 455/450 |
| 2009/0303918 A1 | 12/2009 | Ma et al. | |
| 2010/0315957 A1* | 12/2010 | Koo et al. | 370/246 |
| 2011/0081903 A1* | 4/2011 | Cai et al. | 455/424 |
| 2011/0194483 A1* | 8/2011 | Ji et al. | 370/315 |
| 2011/0244787 A1* | 10/2011 | Kim et al. | 455/7 |
| 2012/0028627 A1* | 2/2012 | Hunzinger | 455/422.1 |

OTHER PUBLICATIONS

International Search Report and Written Opinion mailed Jul. 4, 2011 in PCT application PCT/SE2011/050399.

(Continued)

*Primary Examiner* — Diane Lo
(74) *Attorney, Agent, or Firm* — Baker Botts, LLP (57) ABSTRACT

According to various embodiments, a method is provided at a relay node for enabling subframe allocation between a backhaul link and an access link of the relay node. The relay node is connected to a controlling entity via the backhaul link, and is connectable to at least one user equipment via the access link. The relay node receives a trigger or configuration information from the controlling entity from the controlling entity. Based on the received trigger or configuration information, the relay node sends information to the controlling entity, indicating a resource utilization of the access link and/or indicating a quality of the access link.

31 Claims, 5 Drawing Sheets (56) References Cited

OTHER PUBLICATIONS

R2-102085, 3GPP TSG-RAN WG2 Meeting $69_bis, "Summary of Email Discussion [69#31] LTE: Relay Configuration at Startup/Subfram Reconfiguration", Apr. 12-16, 2010 in Beijing, China.
R2-101164, 3GPP TSG-RAN WG2 #69, "Comparing Alternatiives of MBSFN Subframe Configurations for the Un Interface", Feb. 22-26, 2010, San Francisco, USA.
Tdoc R2-101204, 3GPP TSG-RAN WG2 #69, "Configuration of DL Un Subframes in RN and Donor eNB", Feb. 22-26, 2010, San Francisco, USA.
3GPP Work Item Description; Title: Relays for LTE-Core part, Apr. 9, 2010.
3GPP Work Item Description; Title: Relays for LTE, Apr. 9, 2010.
3GPP Work Item Description; Title: Relays for LTE—Performance part, Apr. 9, 2010.
3GPP TSG-RAN WG2 #69; San Francisco, USA (Tdoc R2-101204); Title: Configuration of DL Un Subframes in RN and Donor eNB, Feb. 22-26, 2010.
3GPP TSG RAN WG2 meeting #69, San Francisco, USA (R2-101097); Title: 6.9.3.2, Feb. 22-26, 2010.
3GPP TSG-RAN WG2 meeting #69; San Francisco, USA (R2-101416); Title: Relay Open Issues, Feb. 22-26, 2010.
3GPP TSG-RAN WG2 #69; San Francisco, USA (R2-101164); Title: Comparing alternatives of MBSFN subframe configurations for the Un interface, Feb. 22-26, 2010.
3GPP TSG-RAN WG2 #69; San Francisco, USA (R2-101542); Title: Consideration on Un link configuration, Feb. 22-26, 2010.
3GPP TSG RAN WG2 Meeting #69; San Francisco, US (R2-101175); Title: MBSFN subframe configuration, Feb. 22-26, 2010.

\* cited by examiner

METHOD AND ARRANGEMENT IN A RELAY NODE AND A CONTROLLING NODE

This application is the U.S. national phase of International Application No. PCT/SE2011/050399, filed 5 Apr. 2011, which designated the U.S., and claims the benefit of U.S. Provisional Application No. 61/322,452, filed 9 Apr. 2010, the entire contents of each of which are hereby incorporated by reference.

TECHNICAL FIELD

The present invention relates generally to methods at a relay node and a controlling entity, and to a corresponding relay node and a controlling entity. In particular, the invention relates to subframe allocation for a relay node.

BACKGROUND

3GPP (the 3rd Generation Partnership Project) is currently standardizing release 10 of the Long Term Evolution (LTE). LTE release 10 and beyond is also referred to as LTE-Advanced.

3GPP LTE release 10 includes support for relays. A relay is an intermediate network node which relays information between one or more mobile terminals, e.g. LTE user equipments (UEs), and another base station, commonly referred to as the donor base station. The donor may be an evolved NodeB (eNB) and may also be referred to as a donor eNB or DeNB. The relay does not have its own fixed backhaul connection, but is instead connected to the core network via a wireless communication link to the donor base station. Thus, relays may be deployed to extend cell coverage, e.g. in areas where no wired backhaul connection is available. The communication link between relay and donor is referred to as the backhaul link, and the link between the relay and a connected mobile terminal is referred to as the access link. The current assumption is that a relay, or relay node (RN) shall have the following characteristics:

- It controls one or more cells, in the following referred to as "relay cells", each of which appears to a user equipment (UE) as a separate cell distinct from the donor cell or cells, i.e. the cells controlled by the donor base station.
- The cells controlled by the relay shall have their own physical cell identity, as defined in LTE Rel-8, and the relay node shall transmit its own synchronization channels, reference symbols, etc.
- The UE shall receive scheduling information and Hybrid Automatic Repeat request (HARQ) feedback directly from the relay node and send its control signalling (SR/CQI/CSI/ACK) to the relay node.
- The additional relay functionality is not expected to impact UEs, and it is required that all legacy LTE UEs can be served by the relay cell.

Figure 1:
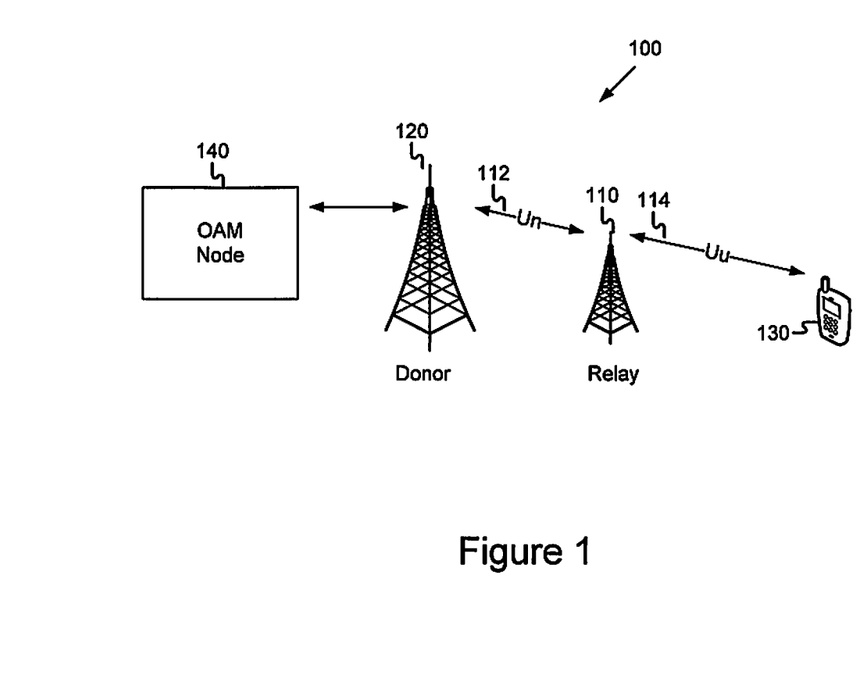
FIG. 1 is a schematic block diagram illustrating a scenario in a radio access network.

Between a relay and its donor eNB, i.e. on the backhaul link, transmissions are done on a radio interface denoted Un. Transmissions between UE and relay, i.e. on the access link, are done over a radio interface denoted Uu, which is the same interface as is used for regular eNB to UE communication. The setup is illustrated in FIG. 1.

If the transmissions on Un, and Uu in the relay cell are performed within the same frequency band, the relay is referred to as an inband relay. In case the transmissions are on separate frequency bands, the relay is referred to as an outband relay.

Figure 2:
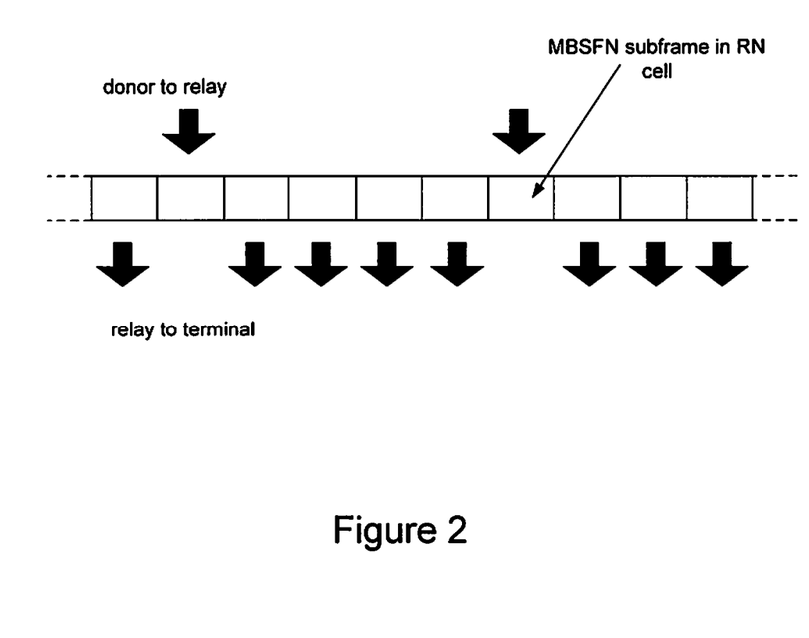
FIG. 2 is a schematic diagram illustrating subframe allocation in a relay node.

To enable inband relays to be functional, some relays cannot transmit on the Uu interface and receive on the Un interface at the same time. To do so could cause severe self-interference, since Uu and Un transmissions are performed within the same frequency. For the downlink (DL), to enable the relay to not transmit anything in its own cell, i.e. on the Uu interface, the relay cell configures certain subframes as MBSFN subframes, where MBSFN stands for Multimedia Broadcast over a Single Frequency Network. During an MBSFN subframe, the UEs in the relay cell do not expect to receive any reference signals or DL data from the relay beyond what is transmitted in the first one or two Orthogonal Frequency Division Multiplexing (OFDM) symbols of the subframe. Instead, the relay node listens to the downlink transmissions on the Un interface during the rest of these subframes, which are hence used for carrying downlink data from donor eNB to RNs. This is illustrated in FIG. 2, which shows MBSFN subframes and the corresponding time multiplexed DL transmissions on the Un (DeNB to RN) and Uu (RN to UE) interfaces. Note that at most six subframes in a radio frame can be configured for MBSFN. Subframes [0 4 5 9] cannot be configured for MBSFN, implying that at most six out of the ten subframes in a radio frame can be used for Un transmissions.

Similarly, in the uplink the relay node cannot both listen to the UE's transmissions on the Uu interface and transmit to its donor eNB on the Un interface. However, in the uplink, there is no problem if the relay node temporarily does not listen to the Uu and hence there is no need for a special configuration to enable the relay to "turn away from" the Uu interface. This can instead be handled by not scheduling any data on Uu in the relevant subframes.

In this disclosure, the terms Un and Uu subframes will be used when referring to the transmission on the different links. MBSFN subframes are assumed to be configured in the relay cell to enable the relay to receive from its donor without self-interference from its own transmission to its UEs.

It has been discussed in 3GPP how to configure the Un allocation for the relay node, i.e. the split between time spent listening to Un and time spent transmitting on Uu, and whether a more or less dynamic reconfiguration procedure should be allowed. Some considerations must be taken when doing the Un/Uu subframe configuration:

- It takes time to change a Un/Uu subframe configuration because once a decision to change the configuration has been made, it has to be propagated to several nodes and equipments. The main time consumer is that the relay is using an MBSFN configuration on the Uu, and to change that configuration requires that the system information broadcast is changed, so that all UEs assuming a certain MBSFN configuration receive information of the change. It could potentially take several seconds before such a change of system information broadcast is applied in the UEs. During this time, it might not be possible to use the new configuration, or potentially not possible to use all slots of the old configuration.
- There needs to be a way to know when the configuration should be changed; it might not be possible for the relay or the donor eNB to make the decision on their own, as they might need input from each other.
- It might be beneficial, or even required, for the UL and DL configuration for Un to match each other so that a UL subframe occurs e.g. four subframes after a DL subframe so that the relay can send an Hybrid Automatic Repeat reQuest (HARQ) ACK/NACK report for received DL packets.

The node controlling the Un/Uu subframe allocation for a relay is likely to be, but is not limited to, the donor eNB or the Operation and Maintenance (OAM) system, or OAM node, in the network. The performance of a relay-enhanced system is quite dependent on the Un/Uu subframe allocations. Alternative configurations can also achieve different things when it comes to capacity, coverage, peak rates etc. The optimal allocation may be different for different relays and for different donor eNBs, and in different radio conditions. However, there is currently no mechanism defined for how the controlling node, e.g. donor eNB, should determine the relay subframe configuration.

SUMMARY

An object of the present invention is to provide a mechanism for subframe configuration for a relay node. According to various embodiments, the relay node helps the controlling entity, e.g. the donor eNB, to make an appropriate subframe allocation decision by providing the controlling entity with information related to the relay Uu link.

Various embodiments provide a method at a relay node for enabling subframe allocation between a backhaul link and an access link of the relay node. The relay node is connected to a controlling entity via the backhaul link, and is connectable to at least one user equipment via the access link. The relay node and controlling node are both comprised in a network. According to the method, the relay receives a trigger to send information, or configuration information determining when to send information, from the controlling entity. Based on the received trigger or configuration information, the relay node sends information indication a resource utilization of the access link and/or an information indication a quality of the access link to the controlling entity.

Various other embodiments provide a method at a controlling entity for determining a subframe allocation between a backhaul link and an access link of a relay node. The relay node is connected to the controlling entity via the backhaul link, and the relay node is connectable to at least one user equipment via the access link. The relay node and controlling node are both comprised in a network. According to the method, the controlling entity sends a trigger to send information, or configuration information determining when to send information, to the relay node. The controlling entity then receives information indicating a resource utilization of the access link and/or information indicating a quality of the access link from the relay node. Based least in part on the received information, the controlling entity determines a subframe allocation for the relay node. The controlling entity then directly or indirectly configures the relay node with the determined subframe allocation.

Further embodiments provide a relay node, which is connectable to a controlling entity via a backhaul link, and connectable to at least one user equipment via an access link. The relay node comprises one or more processing circuits configured to receive, from the controlling entity, a trigger or configuration information determining when to send information to the controlling entity. The processing circuits are further configured to send, to the controlling entity and based on the received trigger or configuration information, information indicating a resource utilization of the access link and/or information indicating a quality of the access link.

Yet further embodiments provide a controlling entity for determining a subframe allocation between a backhaul link and an access link of a relay node. The relay node is connectable to the controlling entity via the backhaul link, and is connectable to at least one user equipment via the access link. The controlling entity is configured to: send, to the relay node, a trigger or configuration information determining when the relay node should send information to the controlling entity. The controlling entity is further configured to receive, from the relay node, information indicating a resource utilization of the access link and/or information indicating a quality of the access link. Moreover, the controlling entity is configured to determine a subframe allocation for the relay node based least in part on the received report or reports, and to directly or indirectly configure the relay node with the determined subframe allocation.

One advantage of the present invention is that the node controlling the Un/Uu subframe allocation is provided with the information needed to make an improved choice of subframe allocation for the Un and Uu interfaces. This improved, better-informed allocation process leads to better use of the radio resources and can bring higher capacity, increased peak rates, improved fairness etc, depending on what the objective is.

ABBREVIATIONS AND TERMINOLOGY

A relay node can also be called a relay eNB, or simply a relay. Abbreviations include RN, ReNB and ReNodeB.

A donor eNodeB can also be called a Donor eNodeB, Donor eNB, anchor cell and anchor eNB.

| | |
|---|---|
| MCS | Modulation and Coding Scheme |
| CSI | Channel State Information |
| CQI | Channel Quality Indicator |
| BSR | Buffer Status Report |

DETAILED DESCRIPTION

There is currently no mechanism defined for how the relay node should help the node controlling the relay subframe configuration, e.g. the donor eNodeB, in its decision, nor definitions for the types of information the relay node should provide to the donor eNB in making a decision if a change or update of the subframe configuration should be beneficial.

In order to configure an optimal relay subframe allocation, depending on what the system aims to achieve in terms of coverage, peak rates, capacity etc., there is first of all a need to have the necessary information available in the node controlling the Un/Uu configuration. This information could, among other things, include the load in different relays, the load coming from UEs directly served by the donor eNB, the link qualities of the Un link(s), the link qualities of the Uu link(s) etc, and combinations of these quantities. Once this information is available to the controlling node, the subframe configuration decision may be impacted in various different ways, as exemplified in the following list:

If the backhaul link (the Un interface) is of bad radio quality compared to the access link (Uu interface), i.e. the backhaul link is the bottleneck, it is beneficial to have more Un than Uu subframes configured.

If the backhaul link (Un interface) is of good radio quality compared to the access link (Uu interface), i.e. the access link is the bottleneck, it is beneficial to have more Uu than Un subframes configured.

Generally, the load situation within the donor eNB cell is important. The optimal Un/Uu subframe configuration is likely to depend on the relation between traffic served directly by the donor eNB and the traffic served via relays.

The interference situation between relays as well as between relays and eNBs—donor eNBs as well as non-donor eNBs—may be reasons for different Un/Uu allocations in different relays.

Thus, the information listed above may help the node controlling the configuration of the Un/Uu subframe allocation to make an appropriate decision. The controlling node is likely, but not limited, to be the donor eNB or the OAM node in the network. Some of this information is already made available to the donor eNB via CQI or CSI reports from directly connected UEs and relays, buffer status reports from UEs and relays, etc. However, the existing information may not be sufficient to allow the controlling node to make an appropriate subframe allocation decision.

According to various embodiments, a Uu utilization indicator and/or a Uu quality indicator are defined in order to let the controlling node, e.g. donor eNodeB, get the information from the relay node about the conditions in the relay cell, on the relay Uu. The indicators give information about the resource utilization and the individual or average link qualities of the Uu in the relay cell. The indicators may be used separately or combined, and may be signalled separately or in a combined form.

The utilization indicator may be determined in various ways such as:
 based on buffer status where the utilization factor increases if buffer utilization increases, e.g. because of poor radio conditions requiring lower modulation and coding schemes (MCSs) or more retransmissions on the Uu interface in the relay cell;
 based on how many resource blocks are sent on average in subframes available for Uu in the RN cell, such that the utilization factor increases if the number of used resource blocks increases.
 based on how many bits are on average scheduled or successfully received over Uu in the relay cell, such that the utilization factor increases if the number of bits scheduled or successfully received increases.

The utilization indicator may be composed of one or more factors determining Uu utilization in the relay cell.

There are furthermore several options for the format of the utilization indicator:
 The utilization indicator may be sent using one or more bits. With one bit, as an extreme, indicating high load and low load only, indicating high load would mean more Uu subframes are needed in the relay cell, while indicating low load would mean the opposite. Whether to indicate high or low load may depend on a defined threshold level for high and low load respectively.
 Fixed size or variable size can be applied for the indicator sent to the donor eNodeB. If a variable length Uu utilization indicator is allowed, a length indicator is additionally needed to correctly decode the indicator at the donor eNodeB. The number of bits used for the indicator depends on the needed granularity. A variable length could give a higher level of optimization possibilities regarding algorithms and allow a finer degree of tuning that could also depend on network configuration and traffic variations thus leaving it open for some implementation flexibility. However, a fixed size may be preferred in some applications, as a variable size requires a length indicator, as well as potentially consuming more bits or requiring more computing as compared to the case where implicit knowledge of length can be assumed.

One example is to allow the utilization indicator to inform about the percentage of radio resources used on the Uu interface. The more bits defined for this purpose, the finer the reporting granularity can be. With only one bit available, this bit could indicate whether the Uu utilization is above or below a certain percentage threshold, and potentially the threshold value is itself a network configurable parameter. With e.g. 3 bits available, the utilization can indicate the load in 12.5% steps, and with 8 bits, an even higher granularity is possible, thereby enabling more advanced algorithms in the controlling node.

Note again, that it may not be desirable to change Un/Uu subframe configuration too often, as a subframe reconfiguration takes time. This could be achieved by:
 use one or at most a few bits in the indicator and make sure that the indicator is sent many times before a reconfiguration is made, to provide enough input to do a reconfiguration.
 use more bits, but send the indicator less often.

It is also possible to send the individual factors determining the Uu utilisation within the utilization indicator field and then let the Uu/Un configuration controlling node determine the overall Uu utilization. However, doing so would lead to a higher signalling load, which is often undesirable.

The link quality indicator may be determined in various ways such as:
 based on the CQIs received from the UEs in the relay cell using information from UE measurement reports
 based on estimated bitrates for different UEs, i.e. estimated spectral efficiency metrics
 if uplink link qualities are desired, these can be based on sounding or other measurements, e.g. on data or control signalling.

The information is typically available per UE in the relay cell. One option is to forward all UE-specific information in form of raw data and let the controlling node do all the processing. Another option is to compile average link qualities or average spectral efficiencies, or other metrics averaged over the relay cell. At least in some applications, the compiled information will be sufficient for use by the controlling node, and compiling the information also offers the advantage of reducing the amount of signaling.

The same format considerations regarding number of bits in the signaling, and fixed or variable length, apply for the link quality indicator as for the utilization indicator.

Several example options are contemplated herein, for when any of the abovementioned indicators should be sent, including:
1. when the measure that the indicator is based on reaches or exceeds a predefined threshold,
2. when the measure that the indicator is based on changes by a predefined amount,
3. periodically, based on e.g. a timer with a preconfigured periodicity, or
4. when requested by the controlling node Regarding signaling options, a possible scenario is that the information is sent to the donor eNB, which uses it itself or forwards it to another controlling node, e.g. the OAM node.

In terms of signaling, the information may be carried from the relay to the donor eNB via Medium Access Control (MAC) signaling or Radio Resource Control (RRC) signaling. Either the donor eNB will request the information or the signaling will be done periodically or according to some other preconfigured rules. The repetition rate etc. can be configured, either hardcoded or through RRC signaling.

On the MAC level the information can be included as part of a MAC control element. Either a new MAC control element is specified to carry this information or the information may be included in existing elements, such as the buffer status report message. MAC control signaling is fast compared to RRC signaling and still provides good robustness. Low overhead is expected as compared to having the physical (PHY) layer do the signaling.

On RRC level, the information can be included as part of an RRC Information Element (IE). Either a new IE is specified to carry this information or the information may be included in existing IEs, such as measurement reports. RRC signaling is very reliable but as a consequence also slower compared to the other signaling options.

In case the configuration decision is out of the control of the donor eNB, the relay can also send the relevant information to the controlling node directly via core network signaling over the S1 protocol or the S11 protocol. In general, the information or indicators may be sent on any other defined interface, proprietary or open, between relay node and configuration control node.

In case the Donor eNB is the responsible node for configuration, the allocation decision may also take neighboring Donor eNBs and regular eNBs into account. Further, this implies that X2 signalling is needed for the inter-eNB communication.

Figure 3:
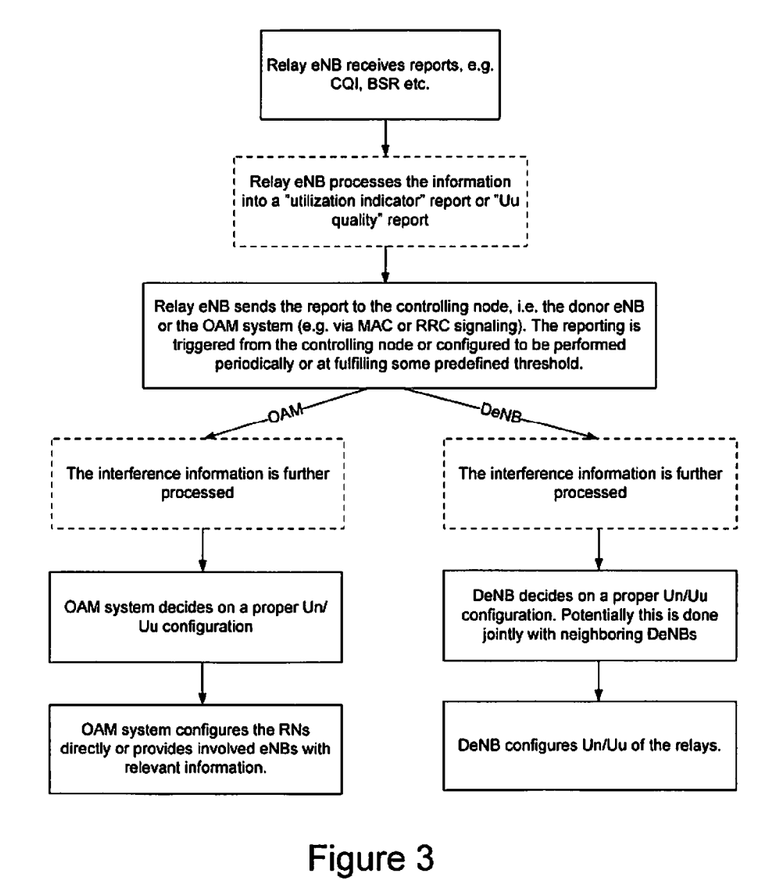
FIG. 3 is a flow chart illustrating a method according to some embodiments.

One or more embodiments, illustrated in the flowchart of FIG. 3, relate to making information about the Uu link qualities and/or Uu radio resource utilization factors known in the node controlling the Un/Uu subframe allocation. Such information can advantageously serve as input to deciding the Un/Uu subframe allocation. Because the relay node knows about the current conditions on the Uu, which the controlling node does not, providing this kind of knowledge to the controlling node enables that controlling node to determine a favourable Un/Uu subframe allocation in a relay cell.

Thus, as a first step in one or more embodiments, the relay node receives reports from connected UEs, e.g. CQI, CSI, BSR etc, or transmissions from connected UEs, e.g. data transmissions, L1 control signalling, etc. The relay eNB processes the information into a report comprising a utilization indicator and/or a quality indicator, as explained above.

The information is sent from the relay to the donor eNB, as part of novel control signaling. If the donor eNB is the node controlling the Un/Uu subframe allocation, no other signaling is required.

In case the OAM node, or potentially some other network node, is responsible for the Un/Uu configuration, the donor eNB is configured to forward the information from the relay to the responsible controlling entity. Of course, that forwarding may rely on passing the information along or through one or more intervening entities.

In another embodiment, the relay is configured with an interface for passing the information to the controlling entity, if such entity is not the donor eNB.

In any case, the Uu/Un controlling node may also combine the novel information with other related information. This other information could be measurements performed in the donor eNodeB, measurements done in other cells/nodes, Un/Uu configurations in other cells and donor eNBs, service/quality assurances etc. The controlling node in one or more embodiments is configured to consider all such information in its determination of an optimum or otherwise preferred Uu/Un subframe configuration.

Figure 4:
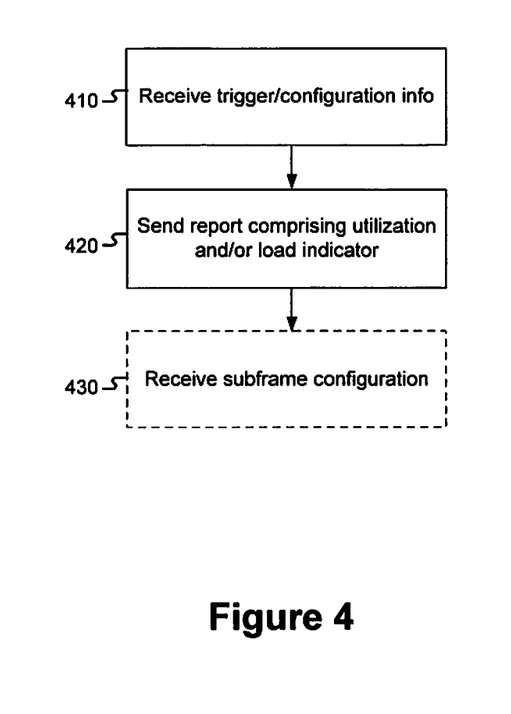
FIG. 4 is a flow chart illustrating a method according to some embodiments.

With reference to FIG. 1 and the flowchart of FIG. 4, a method at a relay node 110 for enabling subframe allocation between a backhaul link 112 and an access link 114 of the relay node 110 according to some embodiments will now be described. FIG. 1 shows a network 100 comprising a relay node 110, a donor eNB 120 and an OAM node 140. The relay node 110 is directly connected to the donor eNB 120 via the backhaul link 112, and is indirectly connected to the OAM node 140. Furthermore, the relay node 110 is connectable to at least one user equipment 130 via the access link 114. In this example, it is assumed that the subframe configuration for the relay node 110 is controlled by a controlling entity, which may be either the donor eNB 120 or the OAM node 140, or a combination of both.

In step 410, the relay node 110 receives from the controlling entity 120, 140 a trigger, e.g. a request, to send a report. In some variants, the relay node 110 instead receives configuration information determining when to send a report to the controlling entity 120, 140. The configuration information may indicate that the report should be sent periodically, or when the measure on which the corresponding indicator is based fulfills a predefined criterion or predefined criteria, e.g. when the measure on which the corresponding indicator is based reaches or exceeds a predefined threshold, or when the measure on which the corresponding indicator is based changes by a predefined amount.

In response to, i.e. based on, the trigger or configuration information, the relay node 110 sends a report to the controlling entity 120, 140 in step 420. The report comprises an indicator of resource utilization of the access link 114 and/or an indicator of quality of the access link 114. The indicators may be determined in various different ways, and based on different measures, as has been described above. The report may be sent using any defined interface between the relay node 110 and the controlling entity, e.g. using RRC or MAC signalling. The report may comprise more than one resource utilization indicator and/or more than one quality indicator.

In particular embodiments, the resource utilization indicator indicates the load of the access link 114 in relation to one or more predefined load threshold levels. Alternatively, or additionally, the quality indicator may indicate the link quality of the access link in relation to one or more predefined quality threshold levels. For example, the load indicator, i.e. resource utilization indicator, and/or the quality indicator may comprise a single bit, which indicates a high or low level with respect to a predefined load or quality threshold level, respectively. In other variants, the indicator of the load and/or the indicator of quality comprise one or more bits indicating a percentage level, as has been described above.

The predefined load threshold level and/or the predefined quality threshold level, may be configured by the network in some embodiments.

In some variants, the method comprises a further step 430 where the relay node 110 directly or indirectly receives a subframe configuration from the controlling entity 120, 140.

It should be noted that it is not strictly necessary to send the information concerning resource utilization and/or quality comprised in a report. Generally speaking, the relay node sends information indicating a resource utilization of the access link, and/or information indicating a quality of the access link.

In another embodiment, the present invention comprises a method at a controlling node of determining or otherwise setting Uu/Un subframe configurations, based at least in part on receiving information indicating Uu link qualities and/or Uu radio resource utilization factors, for an associated relay. Of course, the controlling node may incorporate additional information into its configuration decisions, such as measurements performed in the donor eNodeB (eNB), measurements done in other cells/nodes, Un/Uu configurations in other cells and donor eNBs, service/quality assurances etc. The controlling node in one or more embodiments is configured to consider all such information in its determination of an optimum or otherwise preferred Uu/Un subframe configuration.

Figure 5:
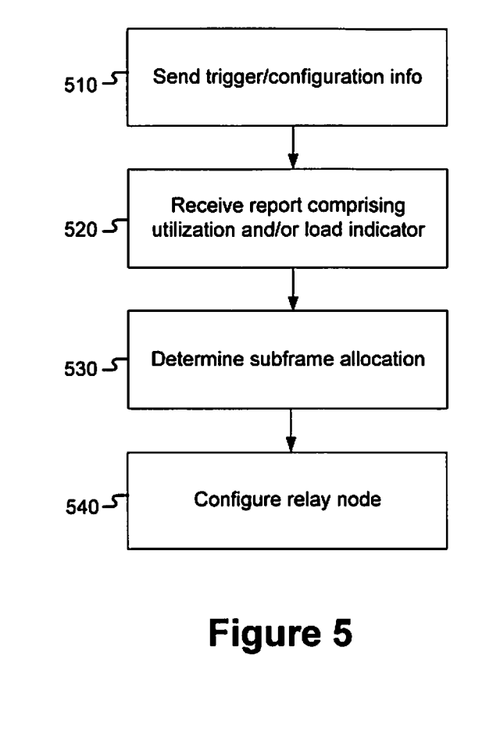
FIG. 5 is a flow chart illustrating a method according to some embodiments.

With reference to FIG. 1 and the flowchart of FIG. 5, a method at a controlling entity 120, 140 for determining a subframe allocation between a backhaul link 112 and an access link 114 of a relay node 110 according to some embodiments will now be described. The basic scenario is the same as described with reference to FIG. 4 above. In this example, it is assumed that the controlling entity, which is responsible for performing the subframe configuration for the relay node 110, may be either the donor eNB 120 or the OAM node 140, or a combination of both.

In step 510, the controlling entity 120, 140 sends a trigger to the relay node 110 to send a report. The trigger may e.g. be a request to send the report. In some variants, the controlling entity 120, 140 instead sends configuration information determining when to send a report to the relay node 110. The configuration information may indicate that the report should be sent periodically, or when the measure on which the corresponding indicator is based fulfils a predefined criterion or predefined criteria, e.g. when the measure on which the corresponding indicator is based reaches or exceeds a predefined threshold, or when the measure on which the corresponding indicator is based changes by a predefined amount.

The controlling entity 120, 140 then receives, 520, at least one report from the relay node 110. The report comprises an indicator of resource utilization of the access link 114 and/or an indicator of quality of the access link 114. The report may be sent using any defined interface between the relay node 110 and the controlling entity 120, 140, e.g. using RRC or MAC signalling. The report may comprise more than one resource utilization indicator and/or more than one quality indicator.

In particular embodiments, the resource utilization indicator indicates the load of the access link 114 in relation to one or more predefined load threshold levels. Alternatively, or additionally, the quality indicator may indicate the link quality of the access link in relation to one or more predefined quality threshold levels. For example, the load indicator, i.e. resource utilization indicator, and/or the quality indicator may comprise a single bit, which indicates a high or low level with respect to a predefined load or quality threshold level, respectively. In other variants, the indicator of the load and/or the indicator of quality comprise one or more bits indicating a percentage level. The predefined load threshold level and/or the predefined quality threshold level, may be configured by the network, e.g. the controlling entity 120, 140, in some variants.

In step 530, the controlling entity 120, 140 determines a subframe allocation for the relay node 110 based least in part on the received report or reports. For example, if the resource utilization indicator indicates high load on the access link 114, and/or the quality indicator indicates low channel quality on the access link 114, this may influence the allocation decision such that more Uu subframes are allocated. The indicators may influence the allocation decision in various other ways, as described above.

The controlling entity 120, 140 then configures the relay node 110 with the determined subframe allocation in step 540. This may be done directly, e.g. if the controlling entity is the donor eNB 120, or indirectly if the controlling entity is the OAM node 140.

It should be noted that it is not strictly necessary to receive the information concerning resource utilization and/or quality comprised in a report. Generally speaking, the relay node sends, and the controlling entity receives, information indicating a resource utilization of the access link, and/or information indicating a quality of the access link.

Figure 6:
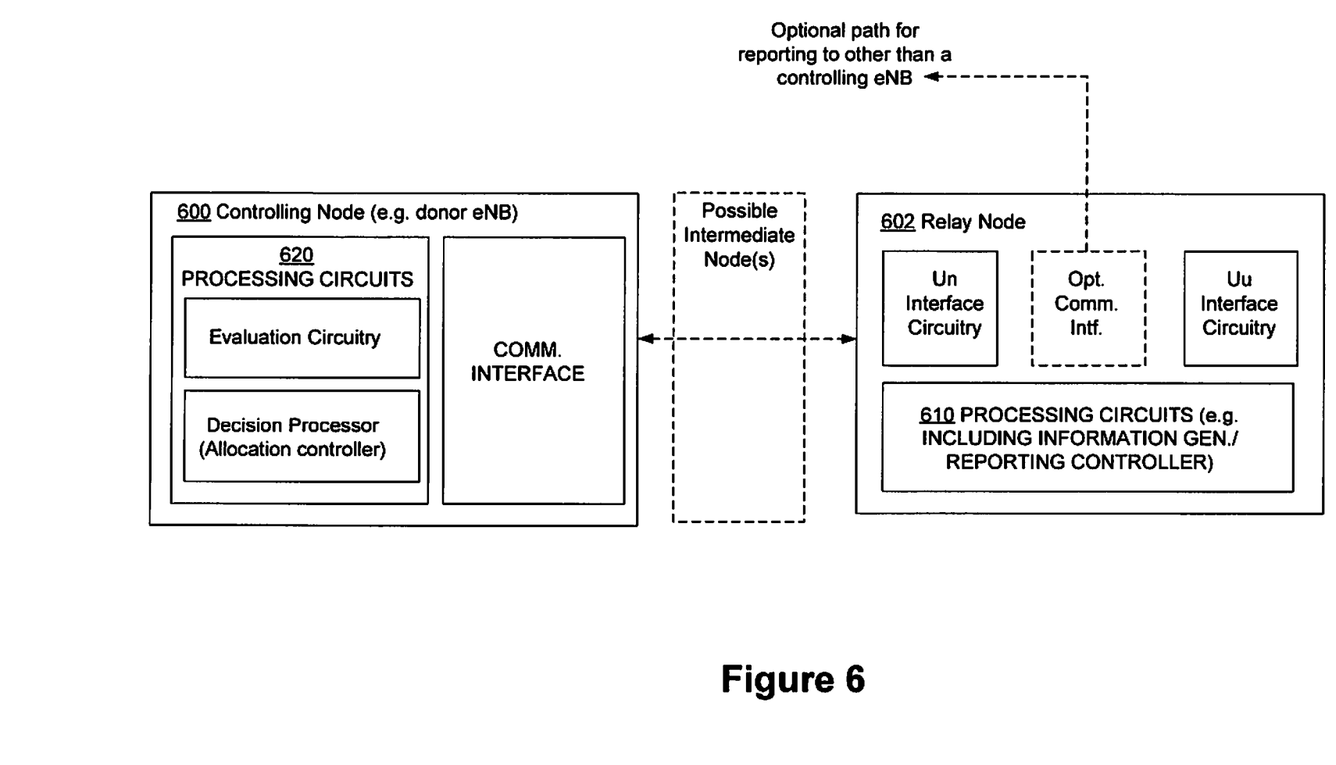
FIG. 6 is a schematic block diagram illustrating an example controlling node and relay node.

In FIG. 6, one sees non-limiting examples of a relay node that is configured according to an embodiment of the present invention. One also sees a controlling node that is configured according to an embodiment of the present invention. Of course, those ordinarily skilled in the art will recognize that the diagrams are simplified for purposes of discussion, and that the illustrated circuits and functions may be arranged differently, without departing from the present invention.

With that in mind, the possible intermediate nodes would be absent, for example, in a case where the relay node provided the novel information directly to the donor eNB that made the allocation decisions taught herein. Similarly, the optional communication interface/reporting path indicated for the relay can be implemented and used where the relay reports the information directly or indirectly to the controlling node, i.e. the decision-making node, but does not do so through the relays donor eNB. But for direct reporting to the donor eNB, or for forwarding through the relays donor eNB, such optional interfaces generally are not needed.

In any case, according to one or more embodiments, the present invention comprises a relay node configured to make information about the Uu link qualities and/or Uu radio resource utilization factors known in the node controlling the Un/Uu subframe allocation. To achieve this, the relay node is configured to generate a report or other signaling, which it is further configured to send directly or indirectly to the controlling node—e.g., the relay node implements novel signaling over the Un interface to its donor eNB. As an example, this information is sent from the relay to the donor eNB, as part of novel control signaling. If the donor eNB is the node controlling the Un/Uu subframe allocation, no other signaling is required. The relay node's processing circuitry may be further configured to make or otherwise obtain such measurements and information, as needed, to generate the Uu link quality information and/or Uu radio resource utilization information.

However, in at least one embodiment, the donor eNB is not the controlling node, and it therefore includes processing circuitry that is configured for forwarding such information directly or indirectly to the controlling node. In case the OAM node, or potentially some other network node, is responsible for the Un/Uu configuration, the donor eNB is configured to forward the information from the relay to the responsible, i.e. controlling, entity. Of course, that forwarding may rely on passing the information along or through one or more intervening entities.

Referring once again to FIG. 6, one or more embodiments provide a relay node 602, which is connectable to a controlling entity 600 via a backhaul link, and connectable to at least one user equipment via an access link. The relay node 602 comprises one or more processing circuits 610. The processing circuits 610 are configured to receive, from the controlling entity 600, a trigger or configuration information determining when to send a report to the controlling entity 600.

The configuration information may indicate that the report should be sent periodically, or when the measure on which the corresponding indicator is based fulfills a predefined criterion or predefined criteria, e.g. when the measure on which the corresponding indicator is based reaches or exceeds a predefined threshold, or when the measure on which the corresponding indicator is based changes by a predefined amount.

The processing circuits 610 are further configured to send, to the controlling entity 600 and based on the received trigger or configuration information, a report comprising an indicator of resource utilization of the access link and/or an indicator of quality of the access link to the controlling node 600. The processing circuits 610 may be configured to determine the indicators in various different ways, and based on different measures, as has been described above. The processing circuits 610 may further be configured to send the report using any defined interface between the relay node 602 and the controlling entity 600, e.g. using RRC or MAC signalling. The report may comprise more than one resource utilization indicator and/or more than one quality indicator.

In particular embodiments, the resource utilization indicator indicates the load of the access link in relation to one or more predefined load threshold levels. Alternatively, or additionally, the quality indicator may indicate the link quality of the access link in relation to one or more predefined quality threshold levels. For example, the load indicator, i.e. resource utilization indicator, and/or the quality indicator may comprise a single bit, which indicates a high or low level with respect to a predefined load or quality threshold level, respectively. In other variants, the indicator of the load and/or the indicator of quality comprise one or more bits indicating a percentage level, as has been described above.

The predefined load threshold level and/or the predefined quality threshold level, may be configured by the network in some embodiments, and thus the processing circuits 610 may be configured to receive the configured threshold levels.

In some variants, the processing circuits 610 may be configured to directly or indirectly receive a subframe configuration from the controlling entity 600.

Again with reference to FIG. 6, one or more embodiments provide a controlling entity 600 configured to determine a subframe allocation between a backhaul link and an access link of a relay node 602. The controlling entity 600 may be a donor eNB or an OAM node. The relay node 602 is connectable to the controlling entity 600 via the backhaul link, and the relay node 602 is connectable to at least one user equipment via the access link. The controlling entity 600 comprises one more processing circuits 620, configured to send, to the relay node 602, a trigger or configuration information determining when the relay node 602 should send a report to the controlling entity 600. The trigger may e.g. be a request to send the report. The configuration information may indicate that the report should be sent periodically, or when the measure on which the corresponding indicator is based fulfils a predefined criterion or predefined criteria, e.g. when the measure on which the corresponding indicator is based reaches or exceeds a predefined threshold, or when the measure on which the corresponding indicator is based changes by a predefined amount.

The processing circuits 620 are further configured to receive, from the relay node 602, a report comprising an indicator of resource utilization of the access link and/or an indicator of quality of the access link to the controlling node 600. The processing circuits 620 may be configured to receive the report using any defined interface between the relay node 602 and the controlling entity 600, e.g. using RRC or MAC signalling. The report may comprise more than one resource utilization indicator and/or more than one quality indicator. In particular embodiments, the resource utilization indicator indicates the load of the access link 114 in relation to one or more predefined load threshold levels. Alternatively, or additionally, the quality indicator may indicate the link quality of the access link in relation to one or more predefined quality threshold levels. For example, the load indicator, i.e. resource utilization indicator, and/or the quality indicator may comprise a single bit, which indicates a high or low level with respect to a predefined load or quality threshold level, respectively. In other variants, the indicator of the load and/or the indicator of quality comprise one or more bits indicating a percentage level. The predefined load threshold level and/or the predefined quality threshold level, may be configured by the network, i.e. the processing circuits 620 may be adapted to configure the threshold levels in the relay node 600 in some variants.

The processing circuits 620 are also configured to determine a subframe allocation for the relay node 602 based least in part on the received report or reports. For example, the processing circuits 620 may be configured such that if the resource utilization indicator indicates high load on the access link, and/or the quality indicator indicates low channel quality on the access link, this may influence the allocation decision such that more Uu subframes are allocated. The indicators may influence the allocation decision in various other ways, as described above.

The processing circuits 620 are further adapted to configure the relay node 602 with the determined subframe allocation. This may be done directly, e.g. if the controlling entity 600 is a donor eNB, or indirectly if the controlling entity is an OAM node.

Additionally, it should be understood that the relay in one or more embodiments is implemented via fixed or programmable circuits, or both. In one example, the relay includes one or more microprocessors, digital signal processors, and/or other digital processing circuitry, possibly arranged in a plurality of different types of processing cards, and that the configuration of such circuitry is made according to the teachings herein, based on the execution of stored computer program instructions, which are stored in memory or another computer-readable medium that is included in or is accessible to the relay.

Still further, it should be understood that the controlling node, e.g. donor eNB or OAM node, in one or more embodiments is implemented via fixed or programmable circuits, or both. In one example, the controlling node includes one or more microprocessors, digital signal processors, and/or other digital processing circuitry, possibly arranged in a plurality of different types of processing cards. In at least one embodiment, the configuration of such circuitry is made according to the teachings herein, based on the execution of stored computer program instructions, which are stored in memory or another computer-readable medium that is included in or is accessible to the controlling node.

Throughout this disclosure, example embodiments have been described where the node responsible for controlling the Un/Uu subframe allocation is the donor eNB. However, it should be recognized that if the control functionality is in another node, e.g. an OAM node, the signaling needs to be forwarded to that other node, e.g., by the eNB and/or other entities, or the relay can be configured with another interface for sending the information to the controlling entity.

Furthermore, when this disclosure refers to "subframe configuration", "subframe allocation", "Un/Uu subframe allocation" etc, this should be understood as encompassing any possible way of configuring the relation between Un and Uu subframes for a relay node. For example, the term "relay node (RN) subframe configuration" may be interpreted as "the subframes used for Un". It is of course equally possible to configure the subframes used for Uu, or to explicitly configure both the subframes used for Uu and Un.

When using the word "comprise" or "comprising" it shall be interpreted as non-limiting, i.e. meaning "consist at least of".

The present invention is not limited to the above-described preferred embodiments. Various alternatives, modifications and equivalents may be used. Therefore, the above embodiments should not be taken as limiting the scope of the invention, which is defined by the appending claims. It should be noted that although terminology from 3GPP LTE has been used in this disclosure to exemplify the invention, this should not be seen as limiting the scope of the invention to only the aforementioned system. Other wireless systems where relays are or will be employed, including WCDMA, WiMax, UMB and GSM, may also benefit from exploiting the ideas covered within this disclosure.

The invention claimed is:

1. A method at a relay node for enabling subframe allocation between a backhaul link and an access link of the relay node, wherein the relay node is connected to a controlling entity via the backhaul link, and the relay node is connectable to at least one user equipment via the access link, the relay node and controlling node being comprised in a network, the method comprising:
receiving, from the controlling entity, a trigger to send information, or configuration information determining when to send information to the controlling entity;
sending, to the controlling entity and based on the received trigger or configuration information, information indicating a resource utilization of the access link and information indicating a quality of the access link to the controlling entity, the information comprising a link quality indicator indicating the quality of the access link, the link quality indicator determined using a plurality of estimated bitrates for a plurality of different user equipment serviced by the relay node; and
receiving, from the controlling entity, a subframe allocation between the backhaul link and the access link of the relay node, the subframe allocation selected by the controlling entity based on the information indicating a resource utilization of the access link and information indicating the quality of the access link as provided by the relay node.

2. The method of claim 1, wherein the information comprises an indicator of the load of the access link in relation to one or more predefined load threshold levels, and an indicator of the quality of the access link in relation to one or more predefined quality threshold levels.

3. The method of claim 2, wherein the indicator of a load and the indicator of a quality comprises one bit, indicating a high or low level with respect to a predefined load or quality threshold level, respectively.

4. The method of claim 2, wherein the predefined load threshold level, and the predefined quality threshold level, is configured by the network.

5. The method of claim 1, wherein the information indicating a resource utilization and the information indicating a quality is an indicator comprising one or more bits indicating a percentage level.

6. The method of claim 1, further comprising:
directly or indirectly receiving a subframe configuration from the controlling entity.

7. The method of claim 1, wherein the relay node receives a trigger from the controlling entity, and said trigger is a request from the controlling entity to send the information.

8. The method of claim 1, wherein the relay node receives configuration information from the controlling entity, said configuration information indicating that the information indicating a resource utilization and the information indicating a quality should be sent periodically, or when the measure on which the corresponding indicator is based fulfills a predefined criterion or predefined criteria.

9. The method of claim 8, wherein the configuration information indicates that the information indicating a resource utilization and the information indicating a quality should be sent when a measure on which the corresponding indicator is based reaches or exceeds a predefined threshold.

10. The method of claim 8, wherein the configuration information indicates that the information indicating a resource utilization and the information indicating a quality should be sent when a measure on which the corresponding indicator is based changes by a predefined amount.

11. The method of claim 1, wherein the information comprises more than one load indicator and more than one quality indicator.

12. The method of claim 1, wherein the controlling entity is a donor eNB, or an OAM node, or a combination of both.

13. The method of claim 1, wherein the information indicating a resource utilization and the information indicating a quality is sent using RRC or MAC signalling.

14. The method of claim 1, wherein the information indicating a resource utilization and the information indicating a quality are comprised in a report.

15. The method of claim 1, wherein the information sent to the controlling entity comprises a link quality indicator indicating the quality of the access link, the link quality indicator based on a plurality of CQIs received from a plurality of user equipment serviced by the relay node.

16. The method of claim 1, wherein the information sent to the controlling entity comprises a link quality indicator indicating the quality of the access link, the link quality indicator comprising an average link quality compiled for a relay cell serviced by the relay node.

17. A method at a controlling entity for determining a subframe allocation between a backhaul link and an access link of a relay node, wherein the relay node is connected to the controlling entity via the backhaul link, and the relay node is connectable to at least one user equipment via the access link, the relay node and controlling node being comprised in a network, the method comprising:
sending, to the relay node, a trigger to send information or configuration information determining when the relay should send information to the controlling entity;
receiving, from the relay node, information indicating a resource utilization of the access link and information indicating a quality of the access link to the controlling node, the information comprising a link quality indicator indicating the quality of the access link, the link quality indicator determined using a plurality of estimated bitrates for a plurality of different user equipment serviced by the relay node;
selecting a subframe allocation between the backhaul link and the access link for the relay node based least in part on the received information indicating a resource utilization of the access link and information indicating the quality of the access link as provided by the relay node;

directly or indirectly configuring the relay node with the determined subframe allocation.

18. The method of claim 17, wherein the information comprises an indicator of the load of the access link in relation to one or more predefined load threshold levels, and an indicator of the quality of the access link in relation to one or more predefined quality threshold levels.

19. The method of claim 18, wherein the indicator of the load and the indicator of quality comprises one bit, indicating a high or low level with respect to a predefined load or quality threshold level, respectively.

20. The method of claim 17, wherein the information indicating a resource utilization and the information indicating a quality is an indicator comprising one or more bits indicating a percentage level.

21. The method of claim 17, further comprising sending a trigger to the relay node, wherein said trigger is a request to send the information.

22. The method of claim 17, further comprising sending configuration information to the relay node, said configuration information indicating that the information indicating a resource utilization and the information indicating a quality should be sent periodically or when the measure on which the corresponding indicator is based fulfils a predefined criterion or predefined criteria.

23. The method of claim 22, wherein the configuration information indicates that the information indicating a resource utilization and the information indicating a quality should be sent when a measure on which the corresponding indicator is based reaches or exceeds a predefined threshold.

24. The method of claim 22, wherein the configuration information indicates that the information indicating a resource utilization and the information indicating a quality should be sent when a measure on which the corresponding indicator is based changes by a predefined amount.

25. The method of claim 17, wherein the information comprises more than one load indicator and more than one quality indicator.

26. The method of claim 17, wherein the controlling entity is a donor eNB, an OAM node, or a combination of both.

27. The method of claim 17, wherein the information indicating a resource utilization and the information indicating a quality is received using RRC or MAC signalling.

28. The method of claim 17, wherein the received information is comprised in a report.

29. The method of claim 28, wherein the controlling entity is a donor eNB or an OAM node.

30. A relay node connectable to a controlling entity via a backhaul link, and connectable to at least one user equipment via an access link, the relay node comprising one or more processing circuits configured to:
   receive, from the controlling entity, a trigger or configuration information determining when to send information to the controlling entity;
   send, to the controlling entity and based on the received trigger or configuration information, information indicating a resource utilization of the access link and information indicating a quality of the access link, the information comprising a link quality indicator indicating the quality of the access link, the link quality indicator determined using a plurality of estimated bitrates for a plurality of different user equipment serviced by the relay node; and
   receive, from the controlling entity, a subframe allocation between the backhaul link and the access link of the relay node, the subframe allocation selected by the controlling entity based on the information indicating a resource utilization of the access link and/or information indicating the quality of the access link as provided by the relay node.

31. A controlling entity for determining a subframe allocation between a backhaul link and an access link of a relay node, wherein the relay node is connectable to the controlling entity via the backhaul link, and the relay node is connectable to at least one user equipment via the access link, wherein the controlling entity is configured to:
   send, to the relay node, a trigger or configuration information determining when the relay node should send information to the controlling entity;
   receive, from the relay node, information indicating a resource utilization of the access link and information indicating a quality of the access link to the controlling node, the information comprising a link quality indicator indicating the quality of the access link, the link quality indicator determined using a plurality of estimated bitrates for a plurality of different user equipment serviced by the relay node; and;
   select a subframe allocation between backhaul link and the access link for the relay node based least in part on the received information indicating a resource utilization of the access link and information indicating the quality of the access link as provided by the relay node; and
   directly or indirectly configure the relay node with the determined subframe allocation.

* * * * *